US011568091B2

(12) United States Patent
Robison et al.

(10) Patent No.: US 11,568,091 B2
(45) Date of Patent: Jan. 31, 2023

(54) METHOD AND SYSTEM FOR INTEGRITY PROTECTED DISTRIBUTED LEDGER FOR COMPONENT CERTIFICATE ATTESTATION

(71) Applicant: Dell Products L.P., Round Rock, TX (US)

(72) Inventors: Charles D. Robison, Buford, GA (US); Vaibhav Soni, Austin, TX (US)

(73) Assignee: Dell Products L.P., Round Rock, TX (US)

(*) Notice: Subject to any disclaimer, the term of this patent is extended or adjusted under 35 U.S.C. 154(b) by 142 days.

(21) Appl. No.: 17/149,956

(22) Filed: Jan. 15, 2021

(65) Prior Publication Data
US 2022/0229938 A1 Jul. 21, 2022

(51) Int. Cl.
*H04L 29/06* (2006.01)
*G06F 21/73* (2013.01)
*H04L 9/32* (2006.01)
*H04L 9/06* (2006.01)
*H04L 9/00* (2022.01)

(52) U.S. Cl.
CPC ............ *G06F 21/73* (2013.01); *H04L 9/0643* (2013.01); *H04L 9/3268* (2013.01); *H04L 9/50* (2022.05)

(58) Field of Classification Search
None
See application file for complete search history.

(56) References Cited

U.S. PATENT DOCUMENTS

| 11,017,090 | B2* | 5/2021 | Jacquin | H04L 9/3236 |
| 2010/0111294 | A1* | 5/2010 | Soppera | H04L 9/3247 |
| | | | | 380/28 |
| 2018/0004953 | A1* | 1/2018 | Smith, II | G06F 21/57 |
| 2022/0229938 | A1* | 7/2022 | Robison | H04L 9/3268 |

OTHER PUBLICATIONS

Tom Dodson, Monty Wiseman, "Trusted Supply Chain & Remote Provisioning With The Trusted Platform Module", Apr. 2018, RSA Conference 2018, p. 1-19. (Year: 2018).*
Tom Dodson et al., Intel, Blockchain Augmentation of the Trusted Supply Chain, RSA Conference 2019, San Francisco CA, Mar. 4-8, 2019, Session ID: PDAC-F02 https://published-prd.lanyonevents.com/published/rsaus19/sessionsFiles/13424/PDAC-F02-Blockchain-Augmentation-of-the-Trusted-Supply-Chain.pdf.
DMTF, Security Protocol and Data Model (SPDM) Architecture White Paper, Document Identifier DSP2058, version 1.0.0, May 13, 2020 https://www.dmtf.org/sites/default/files/standards/documents/DSP2058_1.0.0.pdf.

* cited by examiner

*Primary Examiner* — Jeffery L Williams
(74) *Attorney, Agent, or Firm* — Terrile, Cannatti & Chambers, LLP; Emmanuel A. Rivera

(57) ABSTRACT

A system, method, and computer-readable medium are disclosed for attesting component certificates to particular devices. An enterprise hosted integrity protected distributed ledger, such as a block chain, is provided to publish component certificates. Component vendors are provided authorization tokens to publish their component certificates. Manifests are generated by the original equipment manufacturer (OEM) that includes vendor component identifiers. End users discover the distributed ledger through a verification mechanism, and the component certificates are retrieved from the distributed ledger.

20 Claims, 4 Drawing Sheets

METHOD AND SYSTEM FOR INTEGRITY PROTECTED DISTRIBUTED LEDGER FOR COMPONENT CERTIFICATE ATTESTATION

BACKGROUND OF THE INVENTION

Field of the Invention

The present invention relates to manufacturing of computer systems. More specifically, embodiments of the invention relate to attesting component certificates to particular computer systems.

Description of the Related Art

In manufacturing and integration of computer systems, such as server computers, workstations, laptop computers, data storage systems etc., different parts and sub-systems, collectively referred to as components, may be sourced from various suppliers or vendors.

Component vendors can create certificates associated with their components referred to as component certificates. In addition, the original equipment manufacturer (OEM) of a device (e.g., computer system), such as a laptop computer, can create certificates for a particular computer system platform referred to as platform certificates. Typically, component vendors create the component certificates when the components are manufactured, and OEMs create platform certificates when the devices are manufactured.

Component vendors manufacture components in quantity and may distribute the components to different OEMs. In certain implementations, component certificates cannot be directly stored on components. Component certificates are provided or delivered separate from the components. It is desirable for an OEM of a device to discover and attest to specific component certificates during manufacturing or integration of devices. In addition, an end user of the device may desire to discover and attest to component certificates as to the end user's specific device.

Component vendors can also have vendors that provide sub-components that are integrated into components. Such vendors can provide certificates for their sub-components. Therefore, the tracking, discovering, and attesting certificates becomes even more complicated.

SUMMARY OF THE INVENTION

A system, method, and computer-readable medium are disclosed for attesting component certificates to particular devices. An enterprise hosted integrity protected distributed ledger, such as a block chain, is provided to publish component certificates. Component vendors are provided authorization tokens to publish their component certificates. Manifests are generated by the original equipment manufacturer (OEM) that includes vendor component identifiers. End users discover the distributed ledger through a verification mechanism, and the component certificates are retrieved from the distributed ledger.

BRIEF DESCRIPTION OF THE DRAWINGS

The use of the same reference number throughout the several figures designates a like or similar element. The present invention may be better understood, and its numerous objects, features, and advantages made apparent to those skilled in the art by referencing the accompanying drawings, wherein.

DETAILED DESCRIPTION

Figure 1:
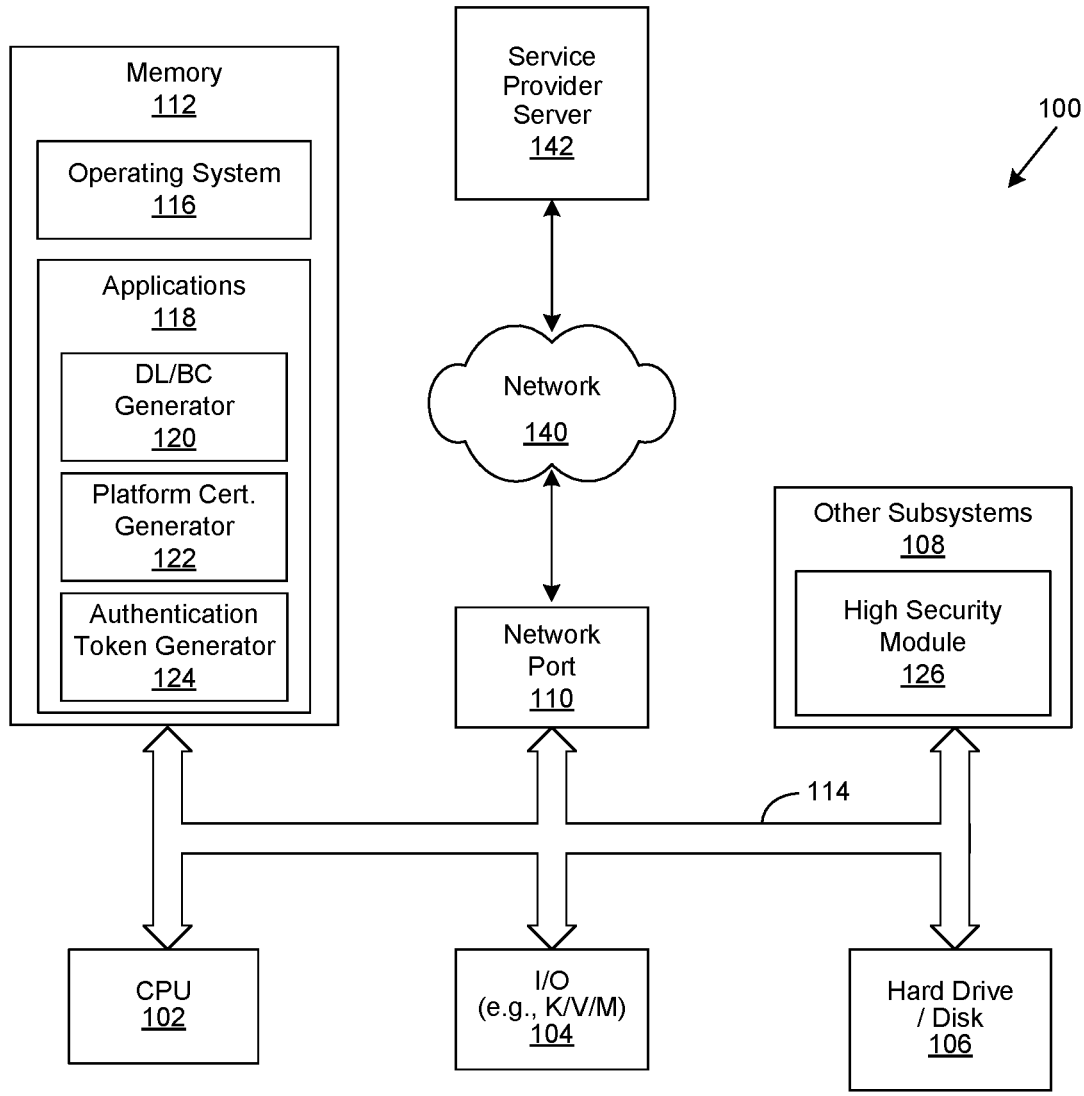
FIG. 1 depicts a general illustration of a computing system as implemented in the system and method of the present invention.

A system, method, and computer readable medium are disclosed for attesting component certificates to particular devices, such as computer systems. A device original equipment manufacturer (OEM) provides an enterprise hosted integrity protected distributed ledger such as a block chain. Device platform and component certificates are published to the distributed ledger/block chain.

In addition, for proof of authority, the OEM (i.e., enterprise of the OEM) provides for necessary connectivity and tools, such as authorization tokens, to component vendors to publish to the distributed ledger/block chain. Therefore, component vendors can publish their component certificates using OEM enterprise provided authorization tokens to the OEM enterprise hosted distributed ledger/block chain.

In the example of a computer system, such as a laptop computer, components that are used in the manufacture of or integrated into the computer system can include a motherboard, hard drive, central processing unit, network card, battery, various memory, etc. In various implementations, components have an identifier, which can include a serial number and/or certificate identifier and can be physically located on the component. This identifier provides a common identifier between the physical component and a published component certificate.

Various implementations provide for the OEM to receive relevant component certificates correlated to the device or serial numbers. The serial numbers along with device identifier can be used to create a device platform certificate. The device platform certificate and signing certificates can be published to the distributed ledger/block chain.

In various embodiments, certificate creation (e.g., device platform certificate) can be implemented using various standards, such as X.509 key certificate and KPCS 11 process standards. An enterprise managed high security module or HSM can be used in a secure digital certificate creation process, producing a signed device platform certificate along with a signing certificate with a public signing key used for attestation. In various implementations, the signed device platform certificate created by the HSM is a manifest of a particular device that includes specific component certificate identifiers (ID). In various implementations, the manifest does not include vendor component certificates, which are published to the distributed ledger/block chain.

Customers or end users can attest to their device and components (i.e., verify authenticity) by pulling component certificates from the distributed ledger/block chain, or looking up the component certificates in the distributed ledger/block chain based on identifiers, and verify that the certificate matches device information.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 illustrates an information handling system 100 that can be used to implement the system and method of the present invention. The information handling system 100 includes a processor (e.g., central processor unit or "CPU") 102, input/output (PO) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The network 140 may be a public network, such as the Internet, a physical private network, a wireless network, a virtual private network (VPN), or any combination thereof. Skilled practitioners of the art will recognize that many such embodiments are possible, and the foregoing is not intended to limit the spirit, scope or intent of the invention.

The information handling system 100 likewise includes system memory 112, which is interconnected to the foregoing via one or more buses 114. System memory 112 further includes an operating system (OS) 116 and applications 118. In certain embodiments, applications 118 are provided as a service from the service provider server 142.

Certain embodiments provide for applications 118 to include a distributed ledger/block chain generator 120, a platform certificate generator 122, and an authentication token generator 124, which are further described herein. In certain implementations, other subsystems 108 can include a high security module or HSM 126 as described above and further described herein.

Figure 2:
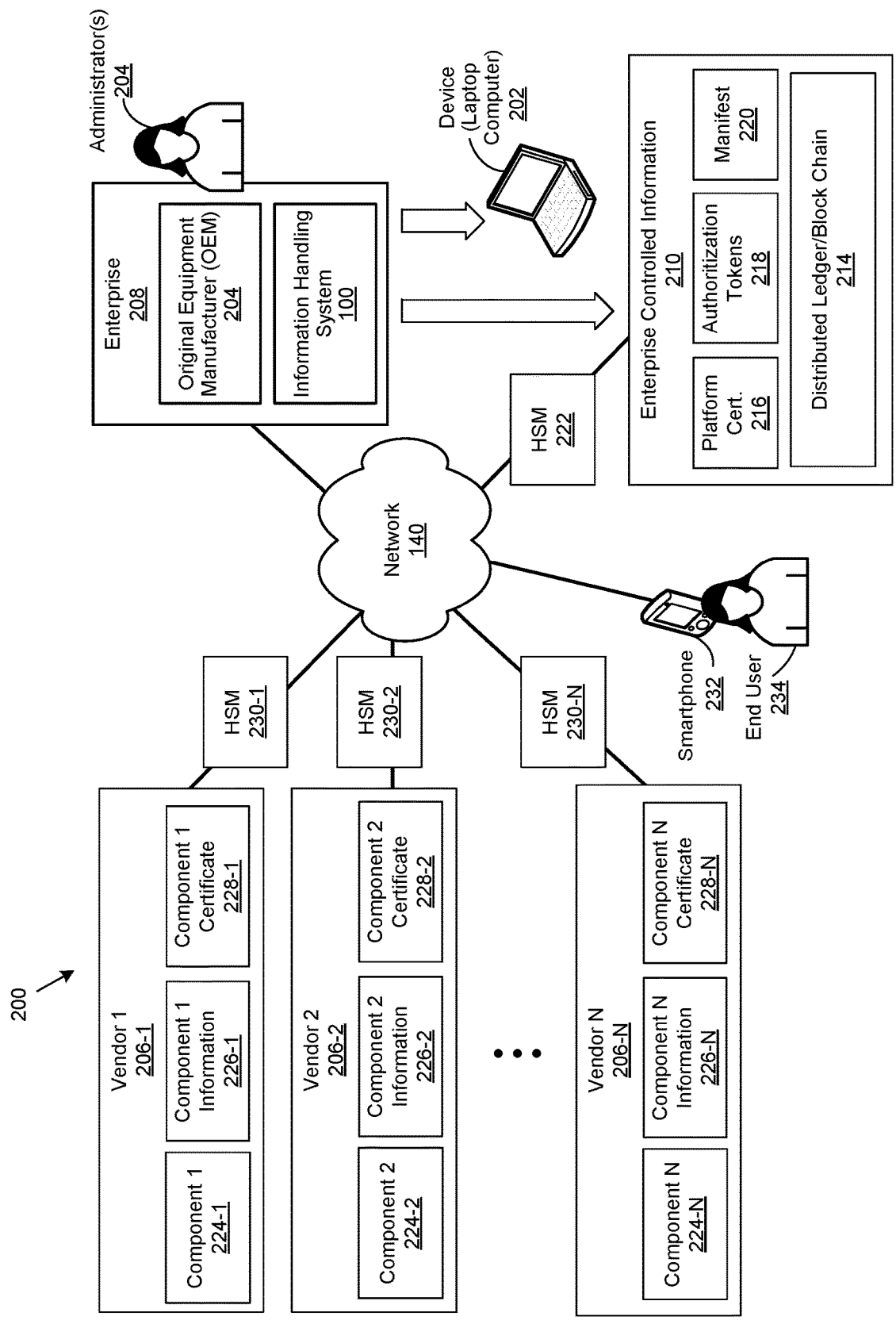
FIG. 2 depicts a system for providing attestation of component certificates to particular computer systems.

FIG. 2 is a simplified block diagram of a system for providing attestation of component certificates to particular computer systems. In particular, the system 200 provides for enterprise hosted integrity protected distributed ledger, such as a block chain. For example, a device or computer system may be a laptop computer, as represented by a device (laptop computer) 202, which is further merely described as laptop computer 202.

An original equipment manufacturer (OEM) 204 manufactures or integrates the laptop computer 202. Various component vendors 206-1, 206-2 to 206-N provide particular components that are integrated into laptop computer 202, such as a motherboard, hard drive, central processing unit, network card, battery, various memory, etc.

The OEM 204 may be considered as including or included in an enterprise 208. The enterprise 208 can include the information handling system 100 as described above. Furthermore, the system 200 includes the network 140 as described above, to which the enterprise 206 and vendors 206 are connected to.

In certain embodiments, the enterprise 208 using the described information handling system 100 of FIG. 1, generates, provides, and maintains enterprise controlled information 210. The enterprise controlled information 210 can be connected to and provide information through the network 140. It is to be understood that the enterprise controlled information 210 can reside on or at various locations, including cloud storage, and can be controlled by the enterprise 208. In various implementations, administrator(s) 212 access(es) the enterprise 208 and administer(s) the enterprise controlled information 210, which may be through the information handling system 100.

As discussed above, in various implementations, the information handling system 100 can include the distributed ledger/block chain generator 120 that creates an enterprise hosted integrity protected distributed ledger or ledgers, such as a block chain or distributed ledger/block chain 214. The information handling system 100 can include the platform certificate generator 122 that creates a device platform certificate 216 as described above. Furthermore, information handling system 100 can include the authentication token generator 124 that creates authorization tokens 218. As discussed, in various implementations, authorization tokens 218 are provided to vendors 206 to publish component certificates to the distributed ledger/block chain 214. A distributed ledger/block chain 214 can be specific to a product line of the OEM 204. Therefore, in various embodiments, the enterprise controlled information 210 includes distributed ledger/block chain 214, device platform certificate 216, and authorization tokens 218.

To provide digital device identification for particular laptop computers 202, the device platform certificate 216 is implemented. The device platform certificate 216 provides for component information such as hard drives, CPUs or memory DIMM manufacturer, model numbers ad serial numbers, among other details, to be included within a digital certificate, such as a X.509 digital certificate. In order to provide a secure information supply chain is for vendors 206 to provide component digital certificates as further described below. Furthermore, various sub-vendors in the supply chain can be provide digital certificates as to their components. For example, chip vendors providing "silicon" to vendors 206 can provide digital certificates to their chips.

In various implementations, as discussed above, a manifest 220 is provided. The manifest 220 can be created by an enterprise managed high security module or HSM 222. The manifest 220 can be a signed device platform certificate 216 created by the HSM 222 as to a particular laptop computer 202. The manifest 220 can include specific component certificate identifiers (ID) and can include a signing certificate with a public signing key used for attestation. Certificate creation can be implemented using various standards, such as X.509 key certificate and KPCS 11 process standards. The enterprise managed high security module or HSM 222 can be used in a secure digital certificate creation process, producing the signed device platform certificate 216 that includes a signing certificate with a public signing key used for attestation. In various implementations, the signed device platform certificate 216 created by the HSM is a manifest of a particular laptop 202 that includes specific component certificate identifiers (ID). For various implementations, the manifest 220 does not include the component certificates, which are published to the distributed ledger/block chain 214.

As discussed, the system 200 includes various component vendors 206-1, 206-2 to 206-N providing different components for OEM 204 to integrate into laptop computer 202.

For example, vendor 1 206-1 provides a component 1 224-1, 206-2 provides a component 224-2, up to vendor N 206-N that provides a component 224-N.

Different numbers of components 224 can be produced by vendors 206. In other words, a batch, or a number of components 224 are produced by vendors 206. Each particular component 224 can have particular and unique component information, such as serial number, service tags, unique identifiers, lot number, etc. Such information can be considered as OEM diagnostics and can be included in a unique manifest 220 for a particular laptop computer 202. The component related information is provided to enterprise 208 to create the unique manifest 220. For example, vendor 1 206-1 provides component 1 information 226-1, vendor 2 206-2 provides component 2 information 226-2, up to vendor N 206-N providing component N information 226-N.

As discussed, vendors 206 provide unique certificates for each particular component 224. For example, vendor 1 206-1 provides component 1 certificate 228-1, vendor 2 206-2 provides component 2 certificate 228-2, up to vendor N 206-N providing component N certificate 228-N. As further discussed above, vendors 206 receive unique authorization tokens 220 to create individual digital component certificates 228 that allow the certificates 228 to be published to the distributed ledger/block chain 214.

In various implementations, each of the vendors 206 are configured to or include a high security module or HSM to secure the digital component certificates 228 in a similar manner as the enterprise managed HSM 222. In certain embodiments, vendor 206-1 is configured to or includes an HSM 230-1, vendor 206-2 is configured to or includes an HSM 230-2, up to vendor 206-N configured to or including an HSM 230-N. In various implementations, HSMs 230 are used to produce a signed digital component certificate with a signing certificate with a public signing key used for attestation.

The system 200 further includes various end user devices (i.e., information handling systems), as represented by a smartphone 232. Such end user devices or smartphone 232 is accessible by end users, represented by end user 234. In various implementations, when an end user 204 receives their laptop computer 202, the end user 234 also receives the device platform certificate 216 associated with the particular device or laptop computer 202. In certain implementations, the end user 234 is provided a web link to access the distributed ledger/block chain 214 which the digital component certificates 228 of their laptop computer 202 are published to. With the proper decryption keys in the device platform certificate 216, end user 234 is able to access the particular digital component certificates 228 of their laptop computer, that are published to the distributed ledger/block chain 214. Therefore, end user 234 is able to attest to the components 224 that are integrated in their particular laptop computer 202.

Figure 3:
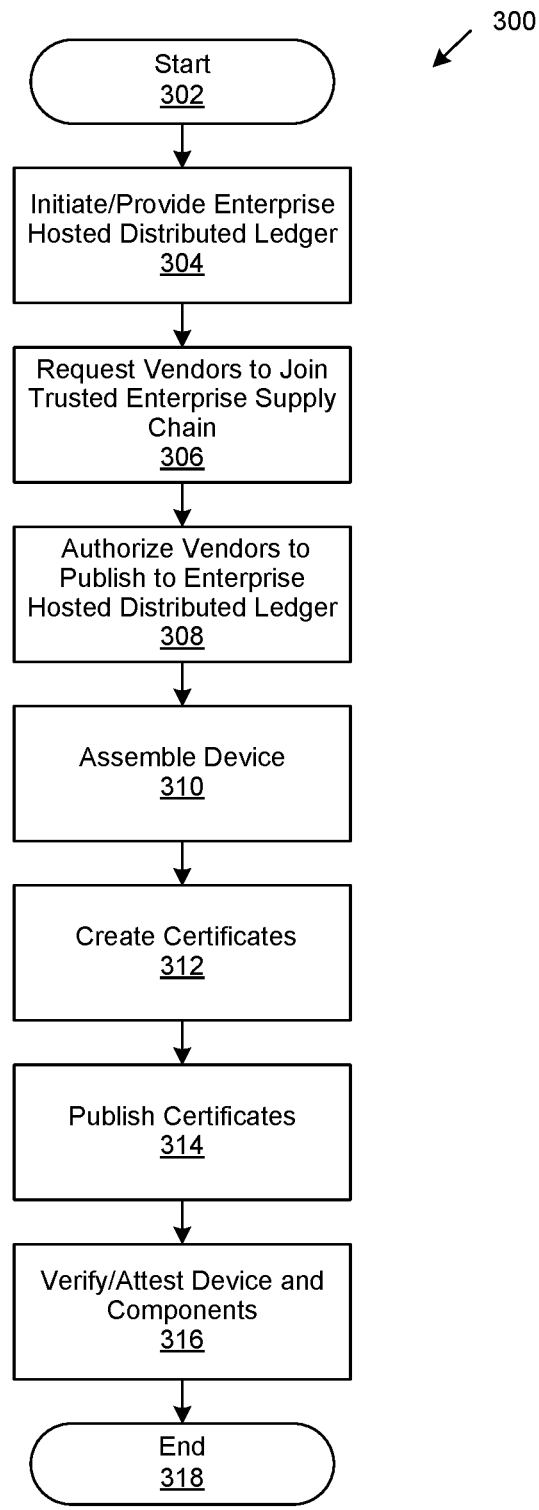
FIG. 3 shows a flow chart for trusted enterprise supply chain attestation.

FIG. 3 is a generalized flowchart 300 for trusted enterprise supply chain attestation. In particular, the flowchart 300 provides for an original equipment manufacturer (OEM) or an enterprise of an OEM to provide a trusted enterprise supply chain as to components of devices of the OEM. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At step 302, the process 300 starts. At step 304, the OEM or the enterprise of the OEM provides for a distributed ledger, such as block chain. An example of a distributed ledger or block chain is distributed ledger/block chain 214 described herein. The distributed ledger or block chain is an enterprise hosted integrity protected distributed ledger that supports the trusted enterprise supply chain.

At step 306, the OEM or the enterprise of the OEM requests vendors (e.g. vendors 206) to join the trusted enterprise supply chain. In various, the vendors provide information as to components to the OEM or the enterprise of the OEM. For example, component information 226 of components 224 are provided to OEM 204 or enterprise 208.

At step 308, authorization is provided to the vendors to publish to the enterprise hosted distributed ledger. The authorization can be provided by the OEM or the enterprise of the OEM. For example, as discussed above, vendors are provided necessary connectivity and tools, such as authorization tokens, to publish to the distributed ledger/block chain. Therefore, component vendors can publish component certificates using OEM enterprise provided authorization tokens to the OEM enterprise hosted distributed ledger/block chain.

At step 310, devices, such as laptop computer 202 are manufactured or assembled by the OEM. The OEM has component information as to the specific components that are installed in the device or laptop computer 202.

At step 312, certificates are created. The certificates can include the device platform certificate(s) 216 and component certificate(s) 228 as described above. In various implementations, the certificates can be secured or encrypted using a high security module or HSM as described above.

At step 314, the components are published to the distributed ledger, such as a block chain. Component vendors can publish component certificates using authorization tokens provided by the OEM or enterprise of the OEM. The device platform certificates can also be published to the distributed ledger or block chain.

At 316, attestation is performed as to the device and its components. In various implementations, a verification mechanism is provided for a customer or end user 234 to attest to a device or laptop 202. Such a verification mechanism can be a mobile application as described above on a separate end user device that provides a link to the distributed ledger or block chain. In a manifest provided to the end user 234 is included certificate IDs used to access the certificates on the distributed ledger or block chain. At step 318, the process 300 ends.

Figure 4:
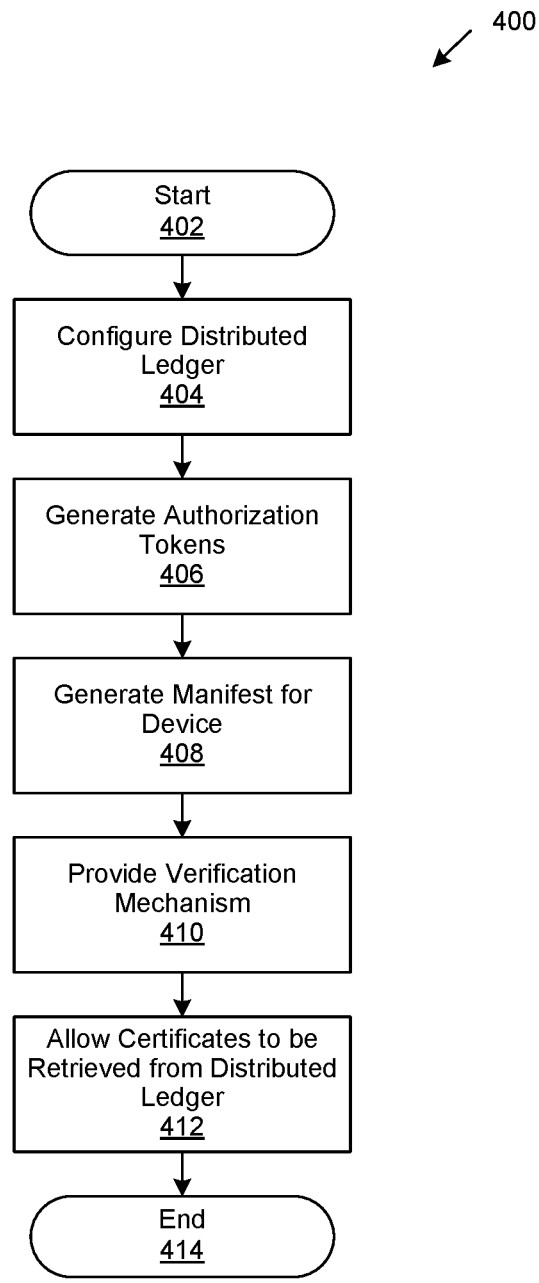
FIG. 4 shows a flow chart for attesting component certificates to particular devices, such as computer systems.

FIG. 4 is a generalized flowchart 400 for attesting component certificates to particular devices, such as computer systems. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At step 402, the process 400 starts. At step 404, configuring an enterprise hosted integrity protected distributed ledger to publish certificates including the component certificates is performed. The distributed ledger can be a block chain. Furthermore, signed device platform certificates can be published to the distributed ledger.

At step 406, generating authorization tokens for the component certificates to be published to the enterprise hosted integrity protected distributed ledger. Each authorization token can be specific to a component certificate. Various implementations provide for other connectivity tools for vendors to publish to the enterprise hosted integrity protected distributed ledger.

At step 408, generating a manifest for a device that includes an identifier is performed. The manifest is particular to a device (e.g., laptop computer) and can include specific component certificate identifiers (ID) and component information.

At step 410, providing a verification mechanism that discovers the enterprise hosted integrity protected distributed ledger is performed. The verification mechanism can be a mobile application on a separate devices that opens a web link to the discovers the enterprise hosted integrity protected distributed ledger.

At block 412, allowing retrieving of the component certificates from the enterprise hosted integrity protected distributed ledger using identifiers in the manifest is performed. At step 414, the process 400 ends.

As will be appreciated by one skilled in the art, the present invention can be embodied as a method, system, or computer program product. Accordingly, embodiments of the invention can be implemented entirely in hardware, entirely in software (including firmware, resident software, microcode, etc.) or in an embodiment combining software and hardware. These various embodiments can all generally be referred to herein as a "circuit," "module," or "system." Furthermore, the present invention can take the form of a computer program product on a computer-usable storage medium having computer-usable program code embodied in the medium.

Any suitable computer usable or computer readable medium can be utilized. The computer-usable or computer-readable medium can be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium can be any medium that can contain, store, communicate, or transport the program for use by or in connection with the instruction execution system, apparatus, or device.

Computer program code for carrying out operations of the present invention can be written in an object oriented programming language such as Java, Smalltalk, C++ or the like. However, the computer program code for carrying out operations of the present invention can also be written in conventional procedural programming languages, such as the "C" programming language or similar programming languages. The program code can execute entirely on the user's computer, partly on the user's computer, as a stand-alone software package, partly on the user's computer and partly on a remote computer or entirely on the remote computer or server. In the latter scenario, the remote computer can be connected to the user's computer through a local area network (LAN) or a wide area network (WAN), or the connection can be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions can also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

Consequently, the invention is intended to be limited only by the spirit and scope of the appended claims, giving full cognizance to equivalents in all respects.

What is claimed is:

1. A computer-implementable method for attesting component certificates to particular devices comprising:
configuring an enterprise hosted integrity protected distributed ledger to publish certificates including the component certificates;
providing authorization tokens that allow for component certificates to be published to the enterprise hosted integrity protected distributed ledger;
generating a manifest for a device that includes component identifiers and certificate identifiers used to access the component certificates on the distributed ledger;
providing a verification mechanism that discovers the enterprise hosted integrity protected distributed ledger; and retrieving the component certificates from the enterprise hosted integrity protected distributed ledger using the certificate identifiers in the manifest.

2. The method of claim 1, wherein the enterprise hosted integrity protected distributed ledger is a block chain.

3. The method of claim 1, wherein the manifest further includes unique component information comprising one or more of serial numbers, service tags, unique identifiers, and lot number.

4. The method of claim 1 further comprising using a high security module to secure component certificates.

5. The method of claim 1, wherein the verification mechanism includes a mobile application on an end user device.

6. The method of claim 1, wherein the retrieving of the component certificates includes using decryption keys to access the enterprise hosted integrity protected distributed ledger.

7. The method of claim 1 further comprising publishing a signed device platform certificate to the enterprise hosted integrity protected distributed ledger.

8. A system comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations and comprising instructions executable by the processor and configured for:
configuring an enterprise hosted integrity protected distributed ledger to publish certificates including the component certificates;
providing authorization tokens that allow for component certificates to be published to the enterprise hosted integrity protected distributed ledger;
generating a manifest for a device that includes component identifiers and certificate identifiers used to access the component certificates on the distributed ledger;
providing a verification mechanism that discovers the enterprise hosted integrity protected distributed ledger; and
retrieving the component certificates from the enterprise hosted integrity protected distributed ledger using the certificate identifiers in the manifest.

9. The system of claim 8, wherein the enterprise hosted integrity protected distributed ledger is a block chain.

10. The system of claim 8, wherein the manifest further includes unique component information comprising one or more of serial numbers, service tags, unique identifiers, and lot number.

11. The system of claim 8 further comprising using a high security module to secure component certificates.

12. The system of claim 8, wherein the verification mechanism includes a mobile application on an end user device.

13. The system of claim 8, wherein the retrieving of the component certificates includes using decryption keys to access the enterprise hosted integrity protected distributed ledger.

14. The system of claim 8 further comprising publishing a signed device platform certificate to the enterprise hosted integrity protected distributed ledger.

15. A non-transitory, computer-readable storage medium embodying computer program code, the computer program code comprising computer executable instructions configured to:
configure an enterprise hosted integrity protected distributed ledger to publish certificates including the component certificates;
provide authorization tokens for the component certificates to be published to the enterprise hosted integrity protected distributed ledger;
generate a manifest for a device that includes component identifiers and certificate identifiers used to access the component certificates on the distributed ledger;
provide a verification mechanism that discovers the enterprise hosted integrity protected distributed ledger; and
retrieve the component certificates from the enterprise hosted integrity protected distributed ledger using the certificate identifiers in the manifest.

16. The non-transitory, computer-readable storage medium of claim 15, wherein the manifest further includes unique component information comprising one or more of serial numbers, service tags, unique identifiers, and lot number.

17. The non-transitory, computer-readable storage medium of claim 15 further comprising using a high security module to secure component certificates.

18. The non-transitory, computer-readable storage medium of claim 15, wherein the verification mechanism includes a mobile application on an end user device.

19. The non-transitory, computer-readable storage medium of claim 15, wherein the retrieving of the component certificates includes using decryption keys to access the enterprise hosted integrity protected distributed ledger.

20. The non-transitory, computer-readable storage medium of claim 15 further comprising publishing a signed device platform certificate to the enterprise hosted integrity protected distributed ledger.

* * * * *